United States Patent
Vieron et al.

(10) Patent No.: US 8,855,204 B2
(45) Date of Patent: *Oct. 7, 2014

(54) METHOD OF PREDICTING MOTION AND TEXTURE DATA

(75) Inventors: Jérôme Vieron, Bedee (FR); Vincent Bottreau, Chateaubourg (FR); Patrick Lopez, Livre sur Changeon (FR)

(73) Assignee: Thomson Licensing, Boulogne-Billancourt (FR)

( * ) Notice: Subject to any disclaimer, the term of this patent is extended or adjusted under 35 U.S.C. 154(b) by 1494 days.

This patent is subject to a terminal disclaimer.

(21) Appl. No.: 12/085,987

(22) PCT Filed: Nov. 23, 2006

(86) PCT No.: PCT/EP2006/068786
§ 371 (c)(1),
(2), (4) Date: Sep. 23, 2009

(87) PCT Pub. No.: WO2007/065796
PCT Pub. Date: Jun. 14, 2007

(65) Prior Publication Data
US 2010/0034269 A1 Feb. 11, 2010

(30) Foreign Application Priority Data
Dec. 5, 2005 (FR) ...................... 05 53713

(51) Int. Cl.
*H04N 7/12* (2006.01)
*H04N 11/02* (2006.01)
*H04N 19/51* (2014.01)
*H04N 19/112* (2014.01)
*H04N 19/53* (2014.01)

(52) U.S. Cl.
CPC ....... *H04N 19/006* (2013.01); *H04N 19/00684* (2013.01); *H04N 19/00048* (2013.01)
USPC .............. 375/240.16; 375/240.11; 348/413.1; 348/416.1

(58) Field of Classification Search
USPC ................ 375/240.11–240.17; 348/441–459, 348/699–702, 411.1–416.1
See application file for complete search history.

(56) References Cited

U.S. PATENT DOCUMENTS 5,270,813 A 12/1993 Puri et al.
5,742,343 A * 4/1998 Haskell et al. ........... 375/240.15

(Continued)

FOREIGN PATENT DOCUMENTS

CN 1390061 A 1/2003
EP 0577337 1/1994

(Continued)

OTHER PUBLICATIONS

Applicant's admitted prior art in the disclosure.*

(Continued)

*Primary Examiner* — Michael Lee
(74) *Attorney, Agent, or Firm* — Robert D. Shedd; Jeffrey M. Navon

(57) ABSTRACT

The invention relates to a method for generating for at least one block of pixels of a picture of a sequence of interlaced pictures at least one motion predictor and at least one texture predictor from motion data, respectively texture data, associated with the pictures of a sequence of low resolution interlaced pictures.

8 Claims, 2 Drawing Sheets

(56) References Cited

U.S. PATENT DOCUMENTS

| | | | |
|---|---|---|---|
| 6,057,884 | A | 5/2000 | Chen |
| 6,400,768 | B1 | 6/2002 | Nagumo et al. |
| 6,493,391 | B1 | 12/2002 | Komori et al. |
| 7,961,785 | B2* | 6/2011 | Marquant et al. ........ 375/240.12 |
| 7,970,056 | B2* | 6/2011 | Soroushian .............. 375/240.12 |
| 8,023,561 | B1* | 9/2011 | Garrido et al. ........... 375/240.15 |
| 8,155,192 | B2* | 4/2012 | Marquant et al. ........ 375/240.16 |
| 2002/0041632 | A1 | 4/2002 | Sato et al. |
| 2003/0086622 | A1 | 5/2003 | Klein Gunnewiek et al. |
| 2003/0185456 | A1 | 10/2003 | Sato et al. |
| 2004/0013195 | A1 | 1/2004 | Panusopone et al. |
| 2005/0089098 | A1* | 4/2005 | Sato et al. ................. 375/240.16 |
| 2005/0129122 | A1* | 6/2005 | Booth et al. ............. 375/240.16 |
| 2005/0190844 | A1* | 9/2005 | Kadono et al. ........... 375/240.16 |
| 2011/0170001 | A1* | 7/2011 | Francois et al. .............. 348/452 |

FOREIGN PATENT DOCUMENTS

| | | |
|---|---|---|
| EP | 0644695 A2 | 3/1995 |
| EP | 0876061 A1 | 11/1998 |
| JP | 06078292 A | 3/1994 |
| JP | 06209468 A | 7/1994 |
| JP | 07162870 A | 6/1995 |
| JP | 1118085 A | 1/1999 |
| JP | 2001045475 A | 2/2001 |
| JP | 2009517941 A | 4/2009 |
| WO | 2005064948 A1 | 7/2005 |
| WO | 2007063017 A1 | 6/2007 |

OTHER PUBLICATIONS

"Spatial Prediction in Scalable Video Coding," A. Vincent et al., Communications Research Centre, Canada, Sep. 14-18, 1995, pp. 244-249.*

"Hierarchical Coding of Digital Television," Tihao Chiang et al., IEEE Communications Magazine, May 1994, pp. 38-45.*

"Spatial Domain Resolution Scalable Video Coding," A Puri et al., Proceedings of the SPIE, vol. 2094, 1993, pp. 718-729.*

"MPEG-2/ECVG Lookahead Hybrid Quantization and Spatially Scalable Coding" by Sadik Bayrakeri and Russel M. Mersereau, Center for Signal and Image Processing, vol. 3024, 1997, pp. 129-137.*

"Extended Spatial Scalability for Non Dyadic Video Formats: from SDTV to HDTV" by Marquant et al, Thomson Video Compression Lab, vol. 5960 No. 1, Jul. 12, 2005, pp. 547-558.*

J. Reichel, H. Schwarz, M. Wien: "Joint Scalable Video Model JSVM-3 Annex S (JVT-P202)", Joint Video Team (JVT) of ISP/IEC MPEG & ITU-T VCEG, Jul. 25, 2005, XP002378451, pp. 1-151.

H. Schwarz et al: "Constrained Inter-Layer Prediction for Single-Loop Decoding in Spatial Scalability" Image Processing, 2005,IEEE Int'l Conference on Genova, Italy Sep. 11-14, 2005, pp. 870-873, XP010851192.

Gwenaelle Marquant et al: "Extended spatial scalability for non-dyadic video formats: From SDTV to HDTV" Proc Spie Int. Soc. Opt. Eng. Proceedings of SPIE—The Int'l Society for Optical Engineering, vol. 5960, No. 1, Jul. 12, 2005, pp. 547-558, XP002378452.

Search Report Jun. 14, 2007.

* cited by examiner

METHOD OF PREDICTING MOTION AND TEXTURE DATA

This application claims the benefit, under 35 U.S.C. §365 of International Application PCT/EP2006/068786, filed Nov. 23, 2006, which was published in accordance with PCT Article 21(2) on Jun. 14, 2007 in English and which claims the benefit of French patent application No. 0553713, filed Dec. 5, 2005.

1. FIELD OF THE INVENTION

The invention relates to a method for generating, for pictures of a high resolution interlaced sequence, at least one motion predictor and, where appropriate, at least one texture predictor from motion data and, where appropriate, texture data associated with pictures of a low resolution interlaced sequence.

2. BACKGROUND OF THE INVENTION

Hierarchical encoding methods with spatial scalability are known. Scalability represents the ability to stagger information to make it decodable at multiple resolution and/or quality levels. More specifically, a data stream generated by this type of encoding method is divided into several layers, in particular a base layer and one or more enhancement layers. These methods are used in particular to adapt a single data stream to variable transport conditions (bandwidth, error ratios, etc.), and to the expectations of the customers and the varying capabilities of their receivers (CPU, specifications of the display device, etc.). In the particular case of spatial scalability, the part of the data stream corresponding to low resolution pictures of the sequence can be decoded independently of the part of the data stream corresponding to high resolution pictures. On the other hand, the part of the data stream corresponding to the high resolution pictures of the sequence can be decoded only from the part of the data stream corresponding to the low resolution pictures.

Hierarchical encoding with spatial scalability makes it possible to encode a first data part called the base layer, relative to the low resolution pictures and, from this base layer, a second data part called the enhancement layer, relative to the high resolution pictures. Normally, each macroblock of the high resolution picture is temporally predicted according to a conventional prediction mode (for example, bidirectional prediction mode, direct prediction method, early prediction mode, etc.) or is predicted according to an inter-layer prediction method. In this latter case, motion data (for example, a partitioning of the macroblock into blocks, possibly motion vectors and reference picture indices) and where appropriate texture data associated with a block of pixels of the high resolution picture, is deduced or inherited from the motion data or respectively texture data, is associated with blocks of pixels of a low resolution picture. However, the known methods do not allow such predictors to be generated in the case where the low resolution sequence and the high resolution sequence are interlaced.

3. SUMMARY OF THE INVENTION

The object of the invention is to overcome at least one of the drawbacks of the prior art.
The invention relates to a method for generating for at least one block of pixels of a picture of a sequence of high resolution interlaced pictures, called high resolution sequence, at least one motion predictor from motion data associated with the pictures of a sequence of low resolution interlaced pictures, called low resolution sequence, of the same temporal frequency as the high resolution sequence. Each interlaced picture comprises a top field interlaced with a bottom field and is able to be coded in frame mode or in field mode. Each field of an interlaced picture has associated with it a temporal reference. The method makes it possible in particular to generate the at least one motion predictor for the at least one block of pixels of the high resolution picture:

from the motion data associated with at least one block of pixels of the top field of a low resolution picture of the same temporal reference as the top field of the high resolution picture if the low resolution picture is coded in field mode; and/or from the motion data associated with at least one block of pixels of the bottom field of the low resolution picture of the same temporal reference as the bottom field of the high resolution picture if the low resolution picture is coded in field mode; and/or from the motion data associated with at least one block of pixels of a low resolution picture comprising a field with the same temporal reference as the top field or bottom field of the high resolution picture if the low resolution picture is coded in frame mode.

According to a first embodiment, the at least one motion predictor is generated for the at least one block of pixels of the high resolution picture by sub-sampling the motion data associated with the at least one block of pixels of the top field of a low resolution picture of the same temporal reference as the top field of the high resolution picture with a horizontal inter-layer ratio in the horizontal direction of the picture and a vertical inter-layer ratio in the vertical direction of the picture.

According to another embodiment, the at least one motion predictor is generated for the at least one block of pixels of the high resolution picture by sub-sampling the motion data associated with the at least one block of pixels of the bottom field of the low resolution picture of the same temporal reference as the bottom field of the high resolution picture, with a horizontal inter-layer ratio in the horizontal direction of the picture, and a vertical inter-layer ratio in the vertical direction of the picture.

According to another embodiment, the at least one motion predictor is generated for the at least one block of pixels of the high resolution picture by sub-sampling the motion data associated with the at least one block of pixels of the low resolution picture which comprises a field with the same temporal reference as the top field or bottom field of the high resolution picture having a horizontal inter-layer ratio in the horizontal direction of the picture and a vertical inter-layer ratio in the vertical direction of the picture.

The method also makes it possible to generate, for the block of pixels of the high resolution picture, at least one texture predictor:

from the texture data associated with at least one block of pixels of the top field of a low resolution picture of the same temporal reference as the top field of the high resolution picture; and/or from the texture data associated with at least one block of pixels of the bottom field of a low resolution picture of the same temporal reference as the bottom field of the high resolution picture; and/or from the texture data associated with at least one block of pixels of each of the top and bottom fields of the low resolution picture.

Advantageously, the motion data associated with the low resolution pictures comprises motion vectors.

Preferably, the motion vectors are associated with a low resolution picture coded in frame mode or with each of the top and bottom fields of a low resolution picture coded in field mode have the same parity.

The method is advantageously used by a method of encoding high resolution pictures from low resolution pictures and by a method of decoding high resolution pictures from low resolution pictures.

Preferably, the low resolution pictures are encoded according to the MPEG-4 AVC standard.

4. BRIEF DESCRIPTION OF THE DRAWINGS

The invention will be better understood and illustrated by means of exemplary embodiments and advantageous implementations, by no means limiting, given with reference to the appended figures in which.

5. DETAILED DESCRIPTION OF THE INVENTION

Figure 1:
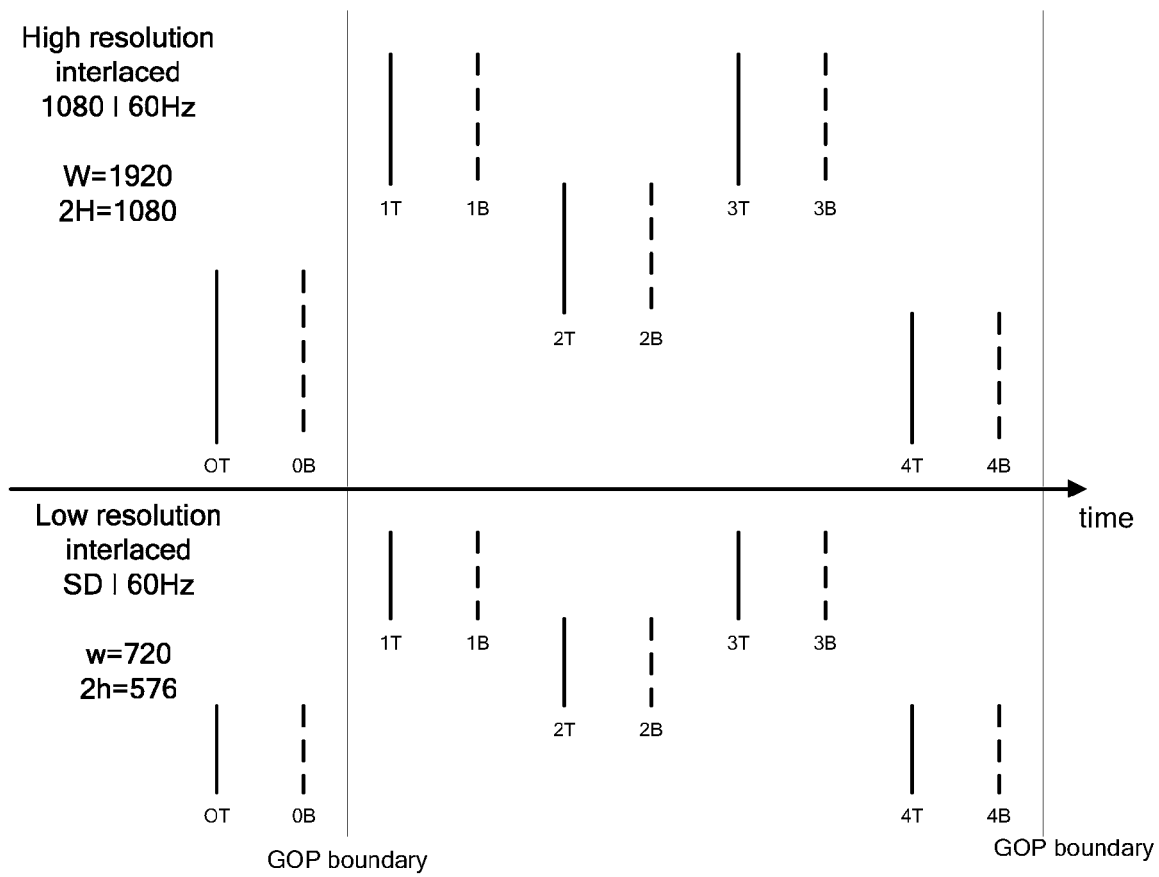
FIG. 1 represents a sequence of low resolution pictures and a sequence of high resolution pictures that are interlaced and have the same temporal frequency.

The invention relates to an inter-layer prediction method which consists in generating motion predictors and, where appropriate, texture predictors for pictures of an ordered sequence of high resolution interlaced pictures, called high resolution sequence, from pictures of an ordered sequence of low resolution interlaced pictures, called low resolution sequence. The sequences are divided into groups of pictures (GOP). Each low and high resolution picture comprises a top field interlaced with a bottom field. In FIG. 1, an interlaced picture of index k is made up of a top field referenced kT and a bottom field referenced kB. A temporal reference is associated with each field of the high and low resolution pictures. A field of a high resolution picture and a field of a low resolution picture having the same temporal reference coincide vertically. The low resolution pictures, also referenced as LR pictures, have a width w (w representing a number of pixels or columns) and a height of 2h (2h representing a number of pixels or lines and means 2×h). Each field of a low resolution picture has a width w and height h. The high resolution pictures, also referenced as HR pictures, have a width W (W representing a number of pixels or columns) and a height of 2H (2H representing a number of pixels or lines and meaning 2×H). Each field of a high resolution picture has a width W and a height H. In the embodiment described, the interlaced pictures can be encoded either in field picture mode, i.e. each field is encoded as a separate picture, or even in frame picture mode, i.e. the two fields are encoded together. The lines of a picture are numbered from 0 and therefore the first line is an even line and the second line (numbered 1) is an odd line.

The invention therefore consists in generating, for pictures of the high resolution sequence or for at least one block of pixels, at least one motion predictor and, where appropriate, at least one texture predictor. A texture predictor associated with a high resolution picture or with at least one block of pixels of a high resolution picture is a picture or a prediction block associated with each of its pixels' texture data (for example, a luminance value and, where appropriate, chrominance values), which is generated from texture data associated with at least one picture (or field) or at least one block of pixels of a low resolution picture (or at least one block of pixels of a field), according to a method of sub-sampling the texture such as the ESS method applied to the texture (ESS standing for Extended Spatial Scalability) that is described in sections S.8.3.6.4 and S.8.5.14.2 of document ISO/IEC MPEG & ITU-T VCEG, entitled "Joint Scalable Video Model JSVM3 Annex-S", referenced JVT-P202, J. Reichel, H. Schwarz, M. Wien. This document is referenced as JSVM3 below. A motion predictor associated with a high resolution picture or with at least one block of pixels of a high resolution picture is defined as a prediction picture or a prediction block which is associated with motion data (for example, a type of partitioning, possibly reference picture indices making it possible to identify the reference pictures to which the motion vectors point). The motion predictor is generated from motion data associated with at least one picture (or field) or at least one block of pixels of a low resolution picture (or at least one block of pixels of a field) according to a motion sub-sampling method such as the ESS method applied to the motion which is described in section S.8.4.1.6.3 of JSVM3, or such as the modified ESS method, described below, derived from the ESS method applied to the motion. The modified ESS method, referenced below as MESS in FIG. 3, makes it possible in particular to process high and/or low resolution interlaced sequences. More specifically, it makes it possible to deal with the case where the height or the width of the high resolution picture is less than that of the low resolution picture. Furthermore, it makes it possible advantageously to avoid having the motion predictors include invalid motion vectors, i.e. vectors that point to unavailable reference pictures, when the prediction method according to the invention is used by a hierarchical encoding or decoding method.

Figure 4:
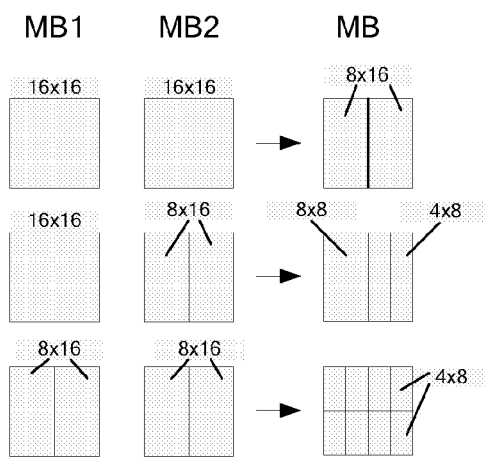
FIG. 4 illustrates the sub-sampling by a factor of 2 in the horizontal direction of the picture of two macroblocks MB1 and MB2 of a low resolution picture and the resulting partitioning for the corresponding predictor macroblock MB_pred.

According to the modified ESS method, an intermediate motion predictor is generated by sub-sampling by 2 the motion data associated with the low resolution picture, more particularly, the motion data associated with each of the macroblocks of the low resolution picture, in the vertical direction of the picture, or in the horizontal direction of the picture, or in both directions. The method of sub-sampling by 2 is repeated in the vertical direction of the picture as long as the height of said intermediate predictor is greater than the height of the high resolution picture and it is repeated in the horizontal direction of the picture as long as the width of said intermediate predictor is greater than the width of the high resolution picture. The sub-sampling consists in particular in dividing by two the coordinates of the motion vectors associated with the blocks of pixels. For example, with reference to FIG. 4, based on two macroblocks MB1 or MB2 of the low resolution picture possibly divided into blocks of pixels, a macroblock MB of the intermediate motion predictor is generated. The size of the blocks of pixels in a macroblock is indicated above said macroblock. For example, in the second line of FIG. 4, the macroblock MB1 is not divided, the macroblock MB2 is divided into two blocks measuring 8 by 16 pixels (denoted 8×16) and the macroblock MB generated from these two macroblocks is divided into four 8×8 blocks, two of which are divided into 4×8 blocks. The indices of reference pictures are made uniform between the blocks of 8 by 8 pixel size within a macroblock MB, and isolated intra-type blocks within a macroblock MB are deleted in the same way as in the ESS inter-layer prediction method applied to the motion and described in JSVM3.

The motion predictor associated with the high resolution picture is generated from the last intermediate motion predictor by applying the ESS method with an inter-layer ratio equal to $$\frac{W}{w_i}$$

in the horizontal direction of the picture and $$\frac{2H}{2h_i}$$

in the vertical direction of the picture, where w, and 2h, are respectively the width and the height of the last intermediate motion predictor generated. Furthermore, for each prediction macroblock, the motion vector inheritance method is modified so as not to generate invalid motion vectors, i.e. vectors that point to fields or frame pictures that are not available in the temporal breakdown process. In this case, if all the motion vectors associated with a prediction macroblock MB_pred are invalid, then the inter-layer motion prediction is not authorized for this macroblock. Otherwise (i.e. if at least one of the vectors is valid), the ESS prediction method applied to the motion is used.

Figure 2:
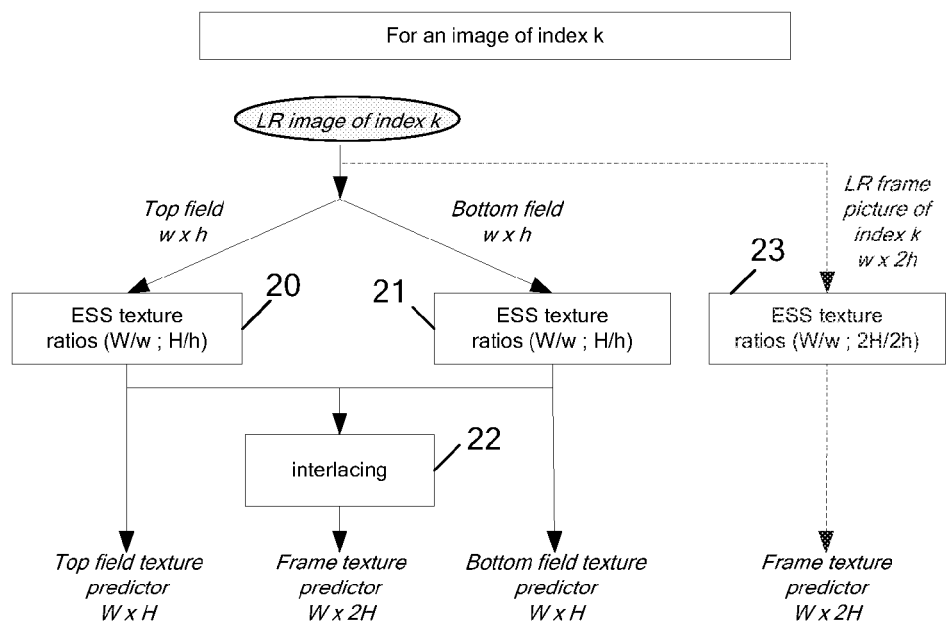
FIG. 2 illustrates the method of generating texture predictors according to the invention in the case where the sequence of low resolution pictures and the sequence of high resolution pictures are interlaced.
Figure 3:
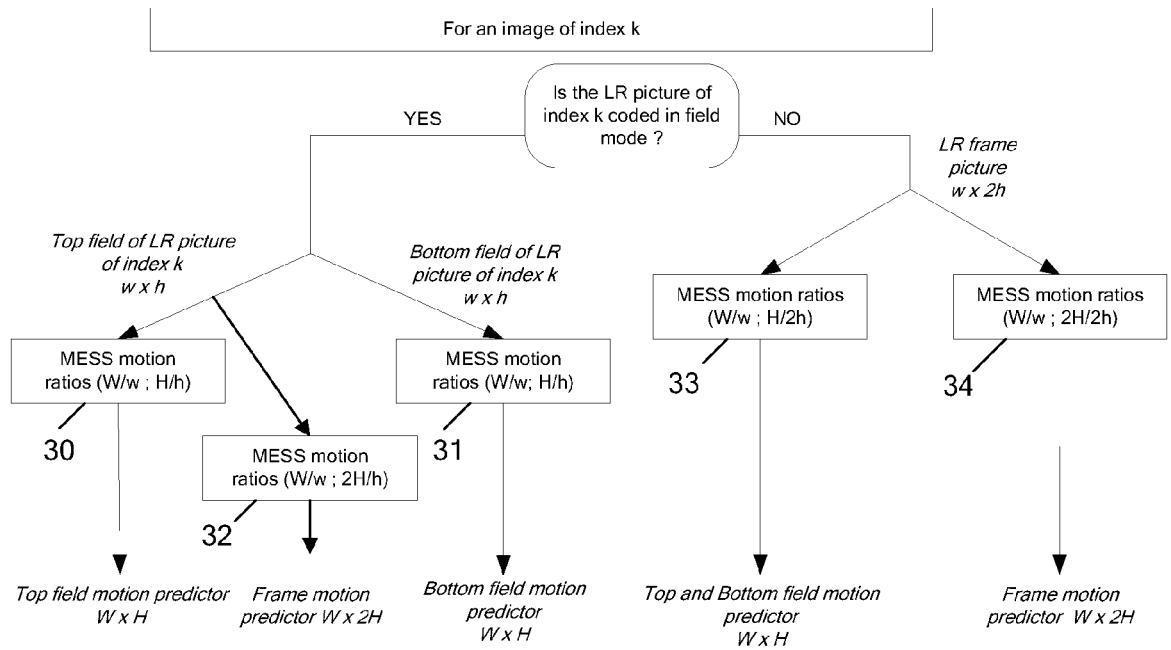
FIG. 3 illustrates the method of generating motion predictors according to the invention in the case where the sequence of low resolution pictures and the sequence of high resolution pictures are interlaced.

The method according to the invention, illustrated by FIGS. 1 to 3, and is described for a picture but can be applied to a part of a picture and in particular to a macroblock. This example makes it possible to handle the case of a low resolution sequence interlaced in the SD format, i.e. of dimension 720 by 288 pixels, 60 Hz, and of a high resolution sequence interlaced in the 1080i format, i.e. of dimension 1920 by 540 pixels, 60 Hz.

Texture predictors associated with a high resolution picture of index k in FIG. 1 are generated in the following manner as illustrated by FIG. 2:

A texture predictor of dimension W by H is generated 20 for the top field of the high resolution picture on the basis of the texture data of the top field of the low resolution picture of index k by applying the ESS method with an inter-layer ratio of in $$\frac{W}{w}$$

the horizontal direction of the picture and $$\frac{H}{h}$$

in the vertical direction of the picture;

A texture predictor of dimension W by H is generated 21 for the bottom field of the high resolution picture on the basis of the texture data of the bottom field of the low resolution picture of index k by applying the ESS method with an inter-layer ratio of $$\frac{W}{w}$$

in the horizontal direction of the picture and $$\frac{H}{h}$$

in the vertical direction of the picture.

A frame texture predictor of dimension W by 2H is generated 22 by interlacing the texture predictors associated with the top and bottom fields.

According to an embodiment illustrated in FIG. 2 by the dotted lines, the frame texture predictor is generated 23 on the basis of texture data of the low resolution frame picture, i.e. the top and bottom fields of the low resolution picture interlaced by applying the ESS method with an inter-layer ratio of $$\frac{W}{w}$$

in the horizontal direction of the picture and $$\frac{2H}{2h}$$

in the vertical direction of the picture.

If the low resolution picture of index k is coded in field mode, motion predictors associated with a high resolution picture of index k in FIG. 1 are generated in the following manner as illustrated by FIG. 3:

a motion predictor of dimension W by H is generated 30 for the top field of the high resolution picture on the basis of the motion data of the top field of the low resolution picture of index k, and for the top field of the high resolution picture on the basis of the low resolution picture of index k by applying the modified ESS method with an inter-layer ratio of $$\frac{W}{w}$$

in the horizontal direction of the picture and $$\frac{H}{h}$$

in the vertical direction of the picture;

A motion predictor of dimension W by H is generated 31 for the bottom field of the high resolution picture on the basis of the motion data of the bottom field of the low resolution picture of index k by applying the modified ESS method with an inter-layer ratio of $$\frac{W}{w}$$

in the horizontal direction of the picture, and $$\frac{H}{h}$$

in the vertical direction of the picture; and

A frame motion predictor of dimension W by 2H is generated 32 on the basis of the motion data of the bottom field of the low resolution picture of index k by applying the modified ESS method with an inter-layer ratio of $$\frac{W}{w}$$

in the horizontal direction of the picture, and $$\frac{2H}{h}$$

in the vertical direction of the picture.

In the other cases, i.e. if the low resolution picture of index k is coded in frame mode, motion predictors associated with a high resolution picture of index k in FIG. 1 are generated in the following manner as illustrated by FIG. 3:

A motion predictor of dimension W by H is generated 33 for the top field of the high resolution picture on the basis of the motion data of the frame low resolution picture of index k by applying the modified ESS method with an inter-layer ratio of $$\frac{W}{w}$$

in the horizontal direction of the picture, and $$\frac{2H}{h}$$

in the vertical direction of the picture;

A motion predictor of dimension W by H is generated 33 for the bottom field of the high resolution picture on the basis of the motion data of the frame low resolution picture of index k by applying the modified ESS method with an inter-layer ratio of $$\frac{W}{w}$$

in the horizontal direction of the picture, and $$\frac{2H}{h}$$

in the vertical direction of the picture; and

A frame motion predictor of dimension W by 2H is generated 34 on the basis of the motion data of the frame low resolution picture of index k by applying the modified ESS method with an inter-layer ratio of $$\frac{W}{w}$$

in the horizontal direction of the picture, and $$\frac{2H}{2h}$$

in the vertical direction of the picture.

In this case, the motion predictors associated with the bottom field and top field of the high resolution picture are identical.

If the method is used by a coding method, all motion predictors (respectively texture predictors) may be generated in order to select the most appropriate one according to a given criteria, e.g. a rate distorsion criteria. If said method is used by a decoding method, then a single motion predictor (respectively a single texture predictor) is generated, the type of predictor being specified in the bitstream.

Of course, the invention is not limited to the above-mentioned exemplary embodiments. In particular, those skilled in the art can apply any variant to the embodiments described and combine them to benefit from their different advantages. For example, the method according to the invention can be applied to a part of the high resolution picture. In practice, it is possible to generate motion and/or texture predictors for blocks of pixels (for example, macroblocks measuring 16 by 16 pixels) of the high resolution picture from motion and/or texture data associated with blocks of pixels of the low resolution pictures. Similarly, the invention has been described in the case where the top field of an interlaced picture is displayed first ("top field first" case) and can be extended directly to the case where the bottom field is displayed first ("bottom field first" case) by reversing the top and bottom fields. Moreover, the invention can also be extended to the case of several high resolution sequences (i.e. several enhancement layers). Furthermore, the invention is advantageously used by a method of encoding or decoding a sequence of pictures or video. Preferably, the sequence of low resolution pictures is encoded according to the MPEG4 AVC encoding standard defined in document ISO/IEC 14496-10 ("Information technology—Coding of audio-visual objects—Part 10: Advanced Video Coding").

The invention claimed is:

1. Method, as part of a scalable encoding or decoding method, for generating for at least one block of pixels of a picture of a high resolution sequence of high resolution interlaced pictures at least one motion predictor from motion data associated with the pictures of a low resolution sequence of low resolution interlaced pictures each interlaced picture comprising a top field interlaced with a bottom field and able to be coded in frame mode or in field mode, each field of an interlaced picture having associated with it a temporal reference, wherein the method comprises generating said at least one motion predictor from the motion data associated with at least one block of pixels of the top field of a low resolution picture of the same temporal reference as the top field of said high resolution picture when said low resolution picture is coded in field mode;

generating said at least one motion predictor from the motion data associated with at least one block of pixels of the bottom field of said low resolution picture of the same temporal reference as the bottom field of said high resolution picture when said low resolution picture is coded in field mode; and generating said at least one motion predictor from the motion data associated with at least one block of pixels of a low resolution picture comprising a field with the same temporal reference as the top field or bottom field of the high resolution picture when said low resolution picture is coded in frame mode.

2. Method according to claim 1, wherein generating said at least one motion predictor for said at least one block of pixels of said high resolution picture comprises subsampling said motion data associated with said at least one block of pixels of said top field of a low resolution picture of the same temporal reference as the top field of said high resolution picture with a horizontal inter-layer ratio in the horizontal direction of the picture and a vertical inter-layer ratio in the vertical direction of the picture.

3. Method according to claim 1, wherein generating said at least one motion predictor for said at least one block of pixels of said high resolution picture comprises subsampling said motion data associated with said at least one block of pixels of said bottom field of said low resolution picture of the same temporal reference as the bottom field of said high resolution picture with a horizontal inter-layer ratio in the horizontal direction of the picture and a vertical inter-layer ratio in the vertical direction of the picture.

4. Method according to claim 1, wherein generating said at least one motion predictor for said at least one block of pixels of said high resolution picture comprises subsampling said motion data associated with said at least one block of pixels of said low resolution picture comprising a field with the same temporal reference as the top field or bottom field of the high resolution picture with a horizontal inter-layer ratio in the horizontal direction of the picture and a vertical inter-layer ratio in the vertical direction of the picture.

5. Method according to claim 1, wherein the method further comprises, for said block of pixels of said high resolution picture:

generating at least one texture predictor from the texture data associated with at least one block of pixels of the top field of a low resolution picture of the same temporal reference as the top field of said high resolution picture; and/or generating at least one texture predictor from the texture data associated with at least one block of pixels of the bottom field of a low resolution picture of the same temporal reference as the bottom field of said high resolution picture; and/or generating at least one texture predictor from the texture data associated with at least one block of pixels of each of said top and bottom fields of said low resolution picture.

6. Method according to claim 1, wherein the motion data associated with the low resolution pictures comprises motion vectors.

7. Method according to claim 6, wherein the motion vectors associated with a low resolution picture coded in frame mode or with each of the top and bottom fields of a low resolution picture coded in field mode have the same parity.

8. Method according to claim 7 wherein the low resolution pictures are encoded according to the MPEG-4 AVC standard.

* * * * *